J. M. LEWIS.
Roller-Skate.
No. 216,687.  Patented June 17, 1879.
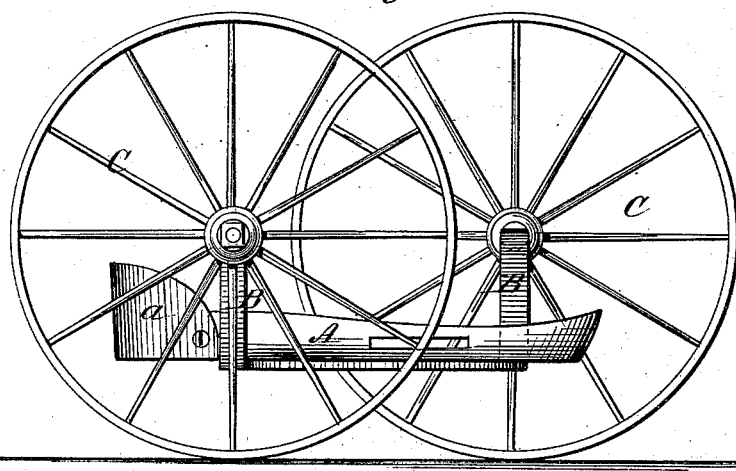
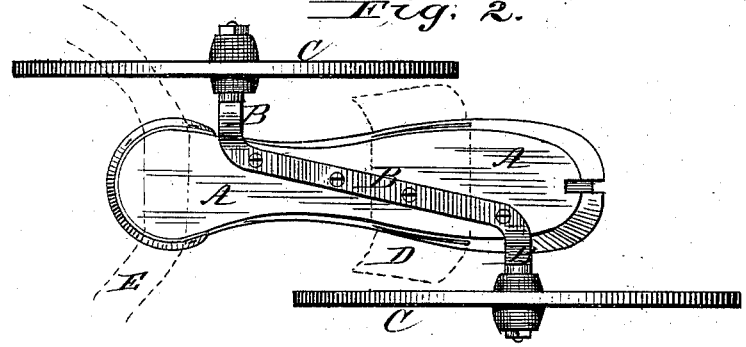
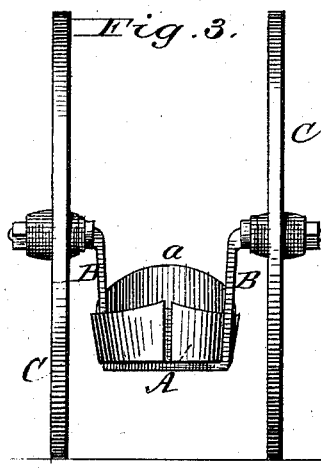
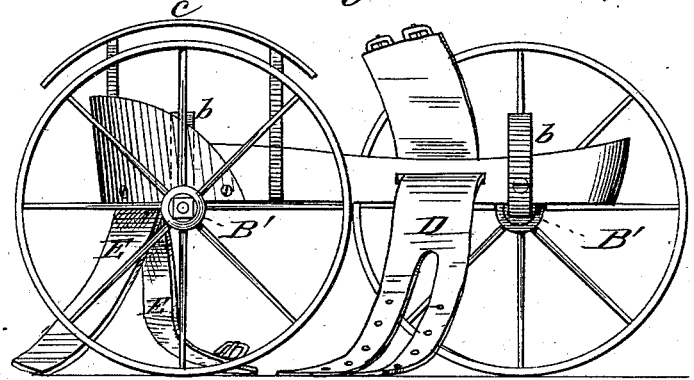
Attest:
H. L. Perrine,
J. W. Hamilton Johnson
Inventor.
James M. Lewis
By. C. H. Slicer
Atty.

UNITED STATES PATENT OFFICE.

JAMES M. LEWIS, OF BALTIMORE, MARYLAND.

IMPROVEMENT IN ROLLER-SKATES.

Specification forming part of Letters Patent No. 216,687, dated June 17, 1879; application filed April 4, 1879.

*To all whom it may concern:*

Be it known that I, JAMES M. LEWIS, of Baltimore city, in the State of Maryland, have invented certain new and useful Improvements in Roller-Skates, which I denominate a "Pedo-Motor;" and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention is a device for attachment to the feet of a person, who may thereby propel himself with ease and rapidity, and is analogous in its purpose to roller-skates, but contemplates a more extended use, in that a person may travel with the pedo-motor upon street sidewalks, pavements, or ordinary roadways.

The device itself is substantially a foot-platform having wheels attached after a peculiar manner.

The invention broadly consists of a foot-platform provided with two wheels, arranged in such a manner as not only to perform all the functions of four wheels, but to avoid the inconvenience of guiding a foot-motor with a normal arrangement of rigid wagon-like wheels. For this purpose two wheels are used—one upon one side of the platform near the toe, and the other upon the opposite side near the heel.

Preferably the rim of one wheel revolves partly within that of the other; but this would depend on the diameter of the wheels with reference to the length of the platform. If a long platform has wheels of small diameter, the wheels would not necessarily revolve one partly within the rim of the other; but this is not a necessity. The height of wheels and length of platform should determine this.

The two wheels being so arranged with their bearing axial points diagonal to each other and on opposite sides, as before stated, the foot is allowed free ankle movement, which is readily imparted to the pedo-motor, thus obtaining that action which is so necessary in describing curves while skating, or even in the "striking out" or starting. Cramping is also avoided by this arrangement.

In the accompanying drawings, Figure 1 represents a side elevation of my pedo-motor; Fig. 2, a bottom view thereof; Fig. 3, a front elevation, showing the crank-axles; and Fig. 4, a side elevation of a modified form, such modification dispensing with the crank-axles, the axle of each wheel terminating in a foot-guard.

The foot-platform A is made in a manner similar to those used in ordinary skates, and may have the usual heel-guard $a$; but from its under side the axles B of the wheels C project near heel and toe at oblique points, thereby bringing one of the wheels forward of the other on the opposite side of said foot platform or plate. I have shown and prefer to have the axles B crank-axles, in order to bring the platform, and consequently the foot of the skater or traveler, as close as may be to the ground, and the axle may or may not be continuous, as shown clearly in Fig. 2. If so arranged continuously it adds strength to the platform. It might, however, be divided—that is, the axle of each wheel might be run under the platform at right angles or otherwise arranged. The usual straps D E are provided for fastening purposes.

In Fig. 4 I have shown a modification, wherein the crank-axles are dispensed with, and in lieu thereof straight axles B' are used, (one for each wheel,) running under the platform and fastened thereto, and terminating in a foot-guard, $b$, as shown. I may also provide a mud-shield or leg-guard, $c$, for the wheels.

The wheels may be spoked, disked, or other wheels, of metal, wood, or other suitable material.

When wheels of large diameter—say from nine inches to one foot—are used, it is necessary that the rim of one wheel should revolve partly within that of the other if the platform is the length of the foot, as it should be.

My invention permits of the most graceful motions in gliding over ground. The skater may perform all the complex evolutions of the ice-skater. He may have free ankle movement and impart it to the platform of the pedo-motor.

The prime advantage is, that it is intended for the use of persons upon the streets—a thing incapable of being accomplished by the usual roller-skate, which can only be used in the "rinks."

The wheels are situated on opposite sides, one near the heel and the other near the toe, and the pedo-motor rocks and conforms to the movement of the foot through the ankle movement.

I claim—

A roller-skate or pedo-motor consisting of a foot plate or platform and two wheels, located respectively near the heel and the toe, and on opposite sides of the foot-plate, substantially as described.

In testimony that I claim the foregoing I have hereunto set my hand this 2d day of April, A. D. 1879.

JAMES M. LEWIS.

Witnesses:
 C. H. SLICER,
 R. K. LEWIS.